Patented Nov. 27, 1934

1,982,199

UNITED STATES PATENT OFFICE 1,982,199

LUBRICANT

Lawrence C. Brunstrum, Chicago, Ill., assignor to Standard Oil Company, Chicago, Ill., a corporation of Indiana No Drawing. Application January 11, 1932, Serial No. 586,079

6 Claims. (Cl. 87—9)

This invention relates to a substantially anhydrous lubricant and pertains more particularly to a plug valve lubricant for use in steam lines.

The object of my invention is to provide a lubricant which will adhere to surfaces on which it is applied, which will form a tight seal (will withstand high pressures for an extended period of time) which will be workable after extended periods of time at all operating temperatures, which will be non-corrosive, and which will be unaffected by hot steam.

A feature of the present invention is the provision in stick form of a substantially anhydrous lime grease with an unusually high graphite content. Heretofore it has been impossible to make stable, workable, anhydrous lime greases which would not crumble or disintegrate. Also it has been the custom to admix relatively small amounts of graphite, usually less than 10%, and rarely as much as 25%, in an oil or grease composition. I have provided a means for incorporating from 35 to 60% of graphite in a lubricant and by means of this graphite I am enabled to provide a substantially anhydrous lime grease. Although I do not limit myself to any theory or explanation of the phenomena, it appears that the solid particles of graphite act as a plasticizer to modify the consistency of the grease to make it stable and workable and at the same time the grease holds the graphite in a putty-like mass which will not leak oil, which will not dry out or crumble, and which will not lose its plasticity even when it is subjected to repeated heating and cooling.

A preferred formula is as follows:

| | Pounds |
|---|---|
| Fatty acid (from hydrogenated fats) | 18.7 |
| Hydrated lime | 2.46 |
| Amorphous graphite | 40.00 |
| Mid-Continent residuum (melting point 85° F.) | 38.0 |
| Hydrogenated fat | 2.0 |

While I do not limit myself to any particular fatty acid I prefer to use an acid having a titre of about 45 to 50, an iodine number of about 10–15 and a neutralization value of about 195 to 198, such acids being produced by splitting hydrogenated fats such as fish oil, lard oil, cotton seed oil, corn oil, rapeseed oil, etc. or mixtures thereof. I prefer to use acids of 18 carbon atoms or more (erucic having 20 and behemic 22), such acids being produced by the splitting of hydrogenated fish oil, particularly menhaden oil, containing appreciable amounts of cottonseed oil and/or rapeseed oil. The particular processes for hydrogenating the fats and splitting the acids therefrom form no part of the present invention, and since they are well known in the art they will not be described in detail. I prefer to use hydrogen acids from this source because I find that the greases which they produce have improved oiliness or lubricating characteristics. I have found that a less amount of them is required to produce a grease of given consistency and I have also found that they materially enhance the uniformity of the products and make it possible to duplicate lubricants very closely. I do not have any theory to explain the relationship between the chemical characteristics of the fatty acids used in making my improved greases and the special properties of the grease. In general, however, I find that if the fatty acid employed has a titre above 45, a neutralization value below 198 and an iodine number above 10, the resulting grease will have the properties desired. The titre may go considerably above 45 and is generally 50 or even 60. The iodine number may go as high as 35 or 40, although a value of 15 is preferable. When the iodine number is high the titre will usually be low.

I may depart slightly from the precise proportions of the above formula without impairing my lubricant. I prefer to maintain a soap to oil ratio of about 1 to 2, but the graphite in the composition may vary from about 35 to 60%. I prefer to use a heavy residual Mid-Continent petroleum oil having a melting point of about 85° F., but I may use a heavier oil, for instance, a 100° melting point residuum, or I may use a heavy steam refined oil having a viscosity upwards of 300 or 400 seconds at 210° F. There is a tendency, however, for the lubricant to leak oil when it is prepared with steam refined oil instead of the residuum.

My lubricant cannot be made by following the conventional method of making cup greases and subsequently adding a filler. Likewise, my method would ruin a cup grease because I drive all of the water out of the lubricant. My process is as follows:

I mix about one-third to one-half of the oil with the lime in a steam jacketed mixer, raise the temperature to about 180 to 200° F. and add the fatty acid thereto. When the neutralization (or saponification if fat is used) is substantially complete it will be found that the mixture (which is called the soap base) may become quite lumpy on cooling, and that when all of the water is boiled out, the finished product does not have the properties which characterize a soap base for a satisfactory lubricant. At this point I add the graphite and continue the stirring. The graphite tends to grind up the soap base and to provide a uniform, pasty mass, and at the same time the graphite particles are coated therewith. When a uniform consistency, a uniform mixture of coated graphite particles, has been obtained, I slowly add the rest of the residual oil and continue the stirring until it is thoroughly admixed with the soap base. Here again the graphite particles serve an important function in working the oil into the soap base, because it would be difficult if not impossible to accomplish this in the absence of graphite. The mass is cast in a block, and when cool it is forced through an orifice to form rods or sticks which are finally coated with powdered mica. When a stick of this lubricant is applied to a plug valve, it is found that the lubricant adheres to the surface thereof and that it is readily workable. Even at high temperatures (400-450) there is no tendency for the lubricant to leak oil or to break down and the lubricant maintains its plasticity under severe conditions.

This lubricant is particularly valuable for use on plug valves in hot steam lines and it has even been used with satisfactory results on hot oil lines. Its use is not limited, however, to these fields and the presence of the unusually high graphite content combined with the anhydrous lime soap and heavy residual oil makes this lubricant invaluable for many other applications.

While I have described in detail a preferred embodiment of my invention, it is understood that I do not limit myself to the details herein set forth except as defined by the following claims, which should be construed as broadly as the prior art will permit.

I claim:

1. A plug valve lubricant which will adhere to surfaces on which it is applied, which will form a tight seal under pressure for extended periods of time, and which will be workable after extended periods of time under severe operating conditions, which lubricant comprises about two parts by weight of graphite, about two parts by weight of a petroleum residue having a melting point of about 85° F. to 100° F. and about one part by weight of a substantially anhydrous lime soap.

2. A plug valve lubricant as defined in claim 1, which contains a small amount of unsaponified fatty oil.

3. A plug valve lubricant as defined in claim 1, wherein the lime soap is prepared from a fatty acid split from a hydrogenated fat.

4. A plug valve lubricant for use under severe operating conditions of temperature and pressure and in contact with hot steam and hot oil, which comprises a petroleum residue having a melting point of about 85° F. to 100° F. processed with about one-half its weight of substantially anhydrous lime soap, and containing about 35% to 60% of graphite.

5. A plug valve lubricant as defined by claim 4, which also contains about 2% of unsaponified fatty oil.

6. A plug valve lubricant as defined by claim 4, in which the lime soap is prepared from a fatty acid split from a hydrogenated fat and having a titre above 45, a neutralization value below 198 and an iodine number above 10.

LAWRENCE C. BRUNSTRUM.